W. A. HENN.
BALL COCK FOR FLUSH TANKS.
APPLICATION FILED MAY 4, 1910.

1,033,100.

Patented July 23, 1912.

Witnesses
W. Ray Taylor
Geo. N. Hamlin

Inventor
William A. Henn
By Frank C. Gore
his Attorney

UNITED STATES PATENT OFFICE.

WILLIAM A. HENN, OF EVANSVILLE, INDIANA.

BALL-COCK FOR FLUSH-TANKS.

1,033,100.

Specification of Letters Patent. Patented July 23, 1912.

Application filed May 4, 1910. Serial No. 559,350.

*To all whom it may concern:*

Be it known that I, WILLIAM A. HENN, a citizen of the United States, residing at Evansville, county of Vanderburg, and State of Indiana, have invented certain new and useful Improvements in Ball-Cocks for Flush-Tanks, of which the following is a specification.

My invention relates to ball cocks for flush tanks.

Ball cocks, as generally constructed, are subject to rusting and breaking of the connection between the ball cock lever and the float ball lever, and the present invention has for its object the provision of a new connection between these parts whereby pivot pins or other parts which might rust or break are done away with, thereby insuring freedom of operation of the ball cock and float lever and the guiding and bracing of the ball cock so that it cannot have lateral play which will result in its jamming or catching, as well as obtaining other advantages which more fully appear hereinafter.

Figure 1:
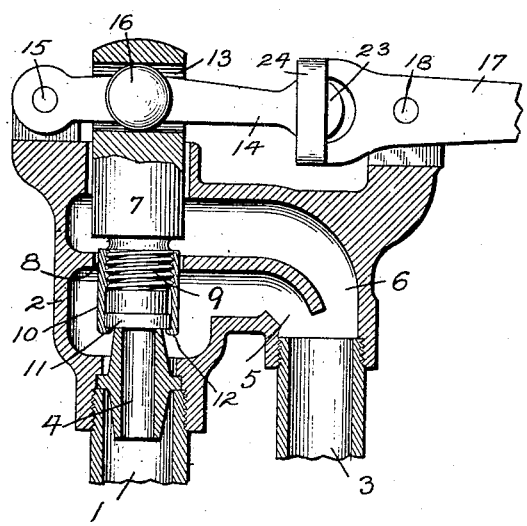
Figure 2:
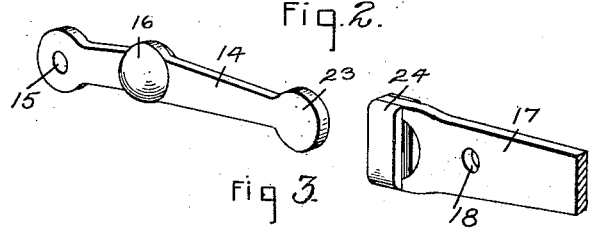
Figure 3:
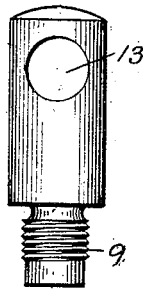
Figure 4:
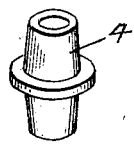
Figure 4:
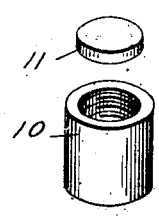

In the accompanying drawings: Figure 1 is a section through the casing and other parts of the ball cock, the ball cock lever and the float lever being shown in elevation; Fig. 2, perspective detail views of the ball cock lever and the connection between it and the float lever; Fig. 3, detail views of the ball cock, washer, and sleeve; and Fig. 4, a detail of the valve seat.

The water supply pipe 1 leads to the ball cock body or casing 2 from which the water is discharged through the outlet 3. The reversible ball cock seat 4 is clamped between the casing 2 and pipe 1 and by unscrewing the parts this seat may be reversed when it becomes worn. The casing 2 is provided with a regular water discharge channel 5 and a supplemental channel 6, said channels being in communication around the stem 7 at 8. The ball valve or cock 7 is provided with a screw-threaded part 9 engaged by a sleeve 10 which clamps the rubber washer 11 against the end of the ball cock stem by reason of the annular shoulder 12. By tightening the sleeve 10, the washer 11 may be suitably held. The said washer is designed to fit against the seat 4. The upper part of the ball cock is provided with an aperture 13 which receives the lever 14 which is pivoted at 15 and provided with a rounded part 16 where it passes through the aperture 13 to reduce the friction at this point. The ball float lever 17 is pivoted at 18 to the casing 2.

The lever 14 has a flattened and rounded end 23 and the lever 17 a vertically disposed elongated stirrup 24 which loosely yet snugly receives the rounded end 23 and permits pivotal coöperation of the levers 14 and 17 without requiring a pivot pin or other connector. The levers being pivoted at 15 and 18, respectively, and the head 23 and the stirrup 24 being disposed in general vertical arrangement, the ball cock is braced and guided in its movements and is prevented from having lateral play and thus any jamming or catching of the ball cock is obviated.

Having thus described my invention, what I claim as new and desire to secure by Letters Patent, is:—

The combination with a ball cock and a pivoted lever operatively connected thereto, of a pivoted float lever, and a connection between the free ends of the ball cock lever and float lever consisting of a vertically disposed flattened rounded end on the ball cock lever and a vertically arranged elongated stirrup rigidly connected to the float lever and loosely receiving said rounded end.

In testimony whereof, I hereunto affix my signature in presence of two witnesses.

WILLIAM A. HENN.

Witnesses:
M. D. HELFRICH,
F. C. GORE.